Sept. 29, 1936.  F. W. MANNING  2,055,874
SURFACE TYPE FABRIC FILTER
Filed Dec. 11, 1935  2 Sheets-Sheet 1
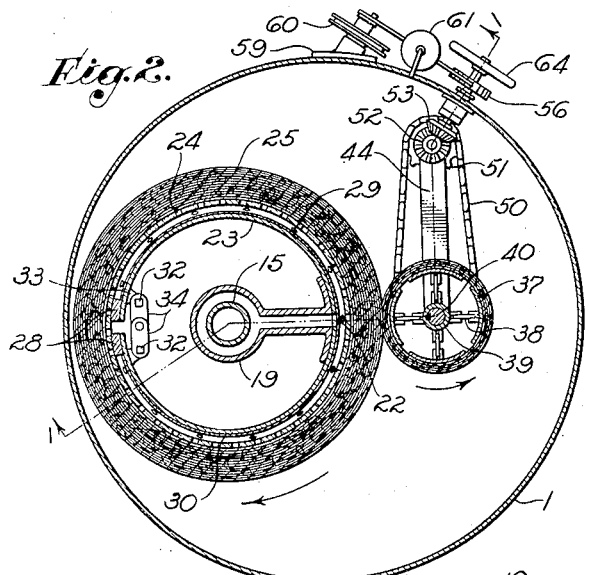
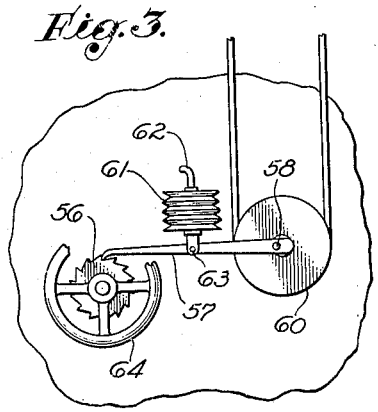
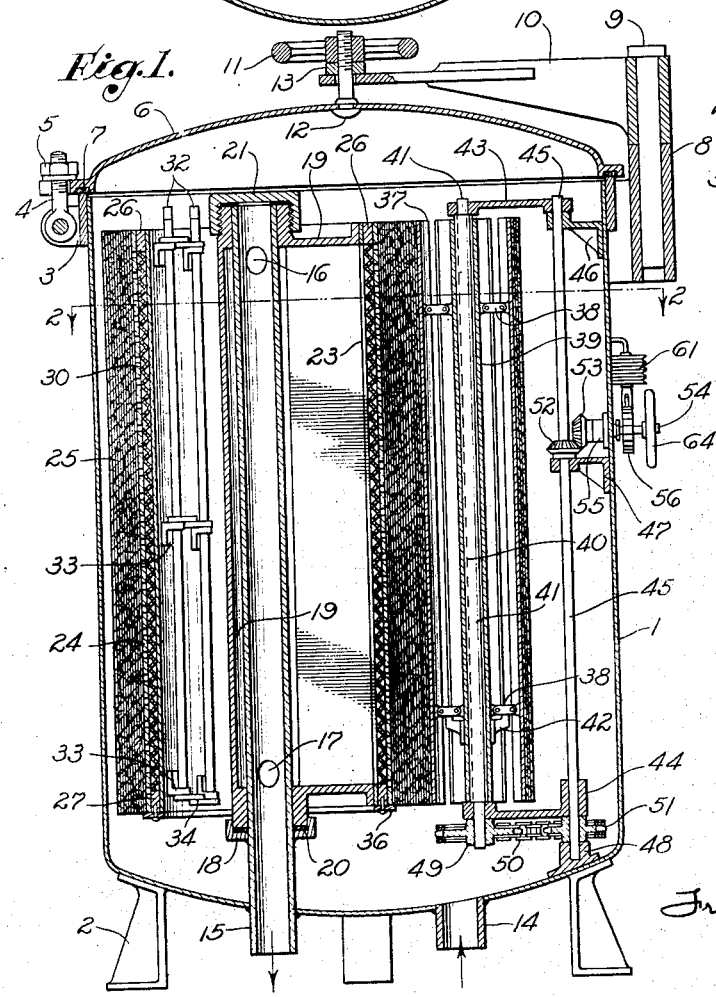
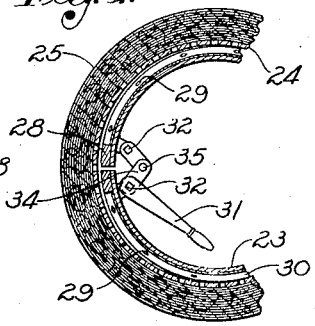
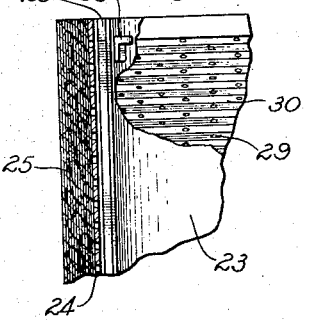
INVENTOR
Fred W Manning Sept. 29, 1936.  F. W. MANNING  2,055,874
SURFACE TYPE FABRIC FILTER
Filed Dec. 11, 1935   2 Sheets-Sheet 2
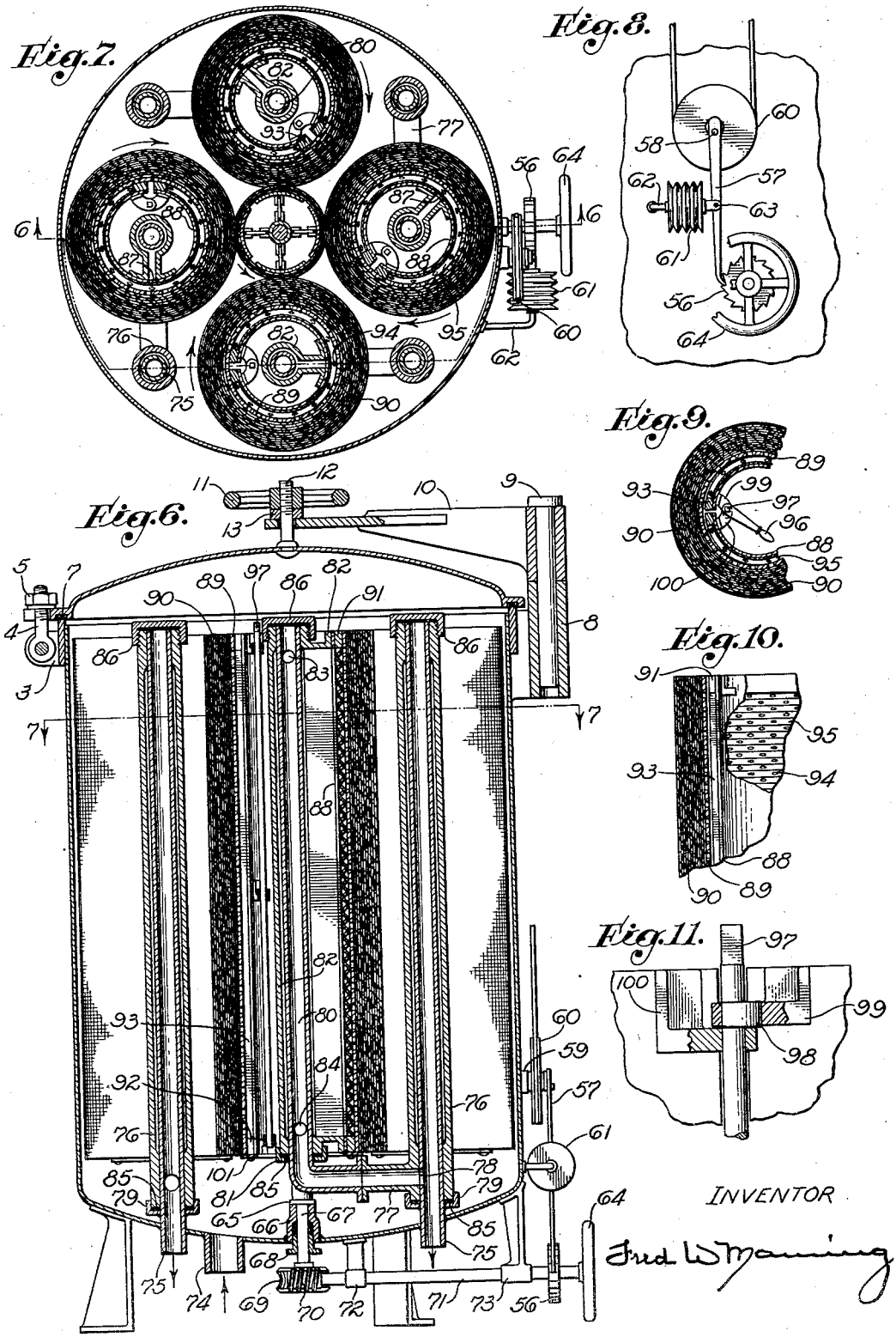
INVENTOR
Fred W Manning Patented Sept. 29, 1936

2,055,874

UNITED STATES PATENT OFFICE 2,055,874

SURFACE TYPE FABRIC FILTER

Fred W. Manning, Pasadena, Calif., assignor to F. W. Manning Company, Ltd., Los Angeles, Calif., a corporation of California Application December 11, 1935, Serial No. 53,912

5 Claims. (Cl. 210—177)

This invention relates to improvements in the treatment of fluids and solids by filtration, and particularly to the removal of solid substances suspended in fluids. This application is a continuation-in-part of an application entitled "Beverage filter", Serial No. 744,523, filed by me on September 18, 1934.

Fabric filters used for the clarification of liquids may be roughly divided into two classes— "depth type" used for those liquids most difficult to filter, such as wine, beer, etc., in which clarity and a high filtering rate is obtained by the distribution of the collected impurities throughout the depth of the filter bed; and "surface type" used for liquids easily filtered, such as water, gasoline, etc., in which the impurities are collected on, or near, the surface of the filter bed. My co-pending application, "Process of countercurrent fabric filtration", filed October 29, 1934, is descriptive of a "depth type", and my present invention, of a "surface type", fabric filter.

It is an object of my invention to provide an arrangement for "surface type" fabric filters whereby cheap foraminous tubes may be wound with suitable filter fabric, such as that described in my Patents Nos. 1,782,784; 1,782,785; and 1,786,669; and a filter tank quickly charged with one or more of these filter rolls, the tubes being discarded after the fabric has been exhausted.

The invention is exemplified in the following description, and one form of apparatus is illustrated by way of example in the accompanying drawings, in which:

Fig. 1 is a vertical section view of a single roll filter taken on line 1—1 of Fig. 2.

Fig. 2 is a horizontal cross-section taken on line 2—2 of Fig. 1.

Fig. 3 is a fragmentary view showing the control arrangement for renewing the perviousness of the filter bed.

Fig. 4 is a fragmentary cross-section of the filter roll showing the drainage member retracted.

Fig. 5 is a fragmentary vertical section of the filter roll showing a portion of the crimp drainage plate in elevation.

Fig. 6 is a vertical section view of a multiple roll filter taken on line 6—6 of Fig. 7.

Fig. 7 is a horizontal cross-section taken on line 7—7 of Fig. 6.

Fig. 8 is a fragmentary view showing the control arrangement for renewing the perviousness of the multiple roll filter beds.

Fig. 9 is a fragmentary cross-section of one of the filter rolls showing the drainage member retracted.

Fig. 10 is a fragmentary vertical section of one of the filter rolls showing a portion of the crimp drainage plate in elevation.

Fig. 11 is a fragmentary elevation of the inside of the retaining wall of one of the filter rolls showing the eccentric shaft arrangement for expanding the sides of the wall.

Referring more specifically to the drawings by reference characters, the filter tank consists of shell 1, legs 2, bolt ring 3, eye bolts 4, eye bolt nuts 5, tank cover 6, cover packing strip 7, cover hinge 8, hinge bolt 9, swivel arm 10, cover lifting wheel 11, lifting wheel stud 12, and washer 13. A feed pipe 14 and a filtrate outlet pipe 15 are welded to the bottom of the tank, the latter having top and bottom filtrate openings 16 and 17 respectively, and a filter roll supporting flange 18. This flange supports the filtrate housing 19, which surrounds and is centralized by the filtrate outlet pipe; and between the flange and the housing is placed a gasket 20 to prevent passage of unfiltered fluid, a cap 21 closing the housing at its upper end. The inlet passage of the housing connects with a slot 22 in the retaining wall 23 to which the housing is riveted or bolted, and the retaining wall supports the perforated cardboard tube 24 on which the filter fabric 25 is wound. Top and bottom rings 26 and 27, respectively, make the circumferential end joints, and strips 28 make the longitudinal joints, between the tube and the retaining wall; and these rings and strips may be flared or ribbed, if necessary, to make sharper contact with the cardboard winding tube. The holes 29 in the foraminous crimped plate 30 allow the filtered liquid to escape to the underside of the latter; and the crimps afford support for the cardboard tube as well as passages for the liquid from the underside of the plate to the slot in the retaining wall opening, which is coincident with the inlet opening in the filtrate housing. To make it possible for the winding tube to be slipped over its retaining wall and then to make close contact therewith, the latter may be retracted and expanded by means of the lever 31 on the squared end of one of the toggle shafts 32. The shafts are held in position on the inside of the retaining wall by brackets 33 and are spaced apart by toggle links 34, whose outer ends are rigidly positioned on the shafts and whose inner ends are coupled together by pins 35. A ring 36, which may be broken in several sections to allow for freer movement of the retaining wall, is attached to the lower end of the latter to support the winding tube in position until the retaining wall has been expanded against it. The removal roll consists of a collapsible arbor comprising arcuate shoes 37, which are attached by radial links 38 to the pipe 39; and in the pipe is embodied a key 40 that engages a keyway in the removal roll shaft 41, the downward movement of the links being prevented by the stops 42 attached to the pipe. The removal roll shaft is supported at the top and bottom by links 43 and 44, respectively, through whose outer ends pass the driving shaft 45, which in turn is supported at top, center and bottom by the bearings 46, 47 and 48, respectively. The rotation of the arbor is accomplished through sprocket wheel 49 keyed to the removal roll shaft; sprocket chain 50; sprocket wheel 51, keyed to the driving shaft; bevel gear 52, also keyed to the driving shaft; bevel gear 53, keyed to a shaft 54, which passes through a stuffing box 55; ratchet wheel 56, keyed to the outer end of the latter shaft; pawl 57, engaged to an eccentric portion of the shaft 58, which is supported by a bearing 59; and a constantly rotating pulley 60, keyed to the pawl shaft and driven from a source of power not shown. An expansion bellows 61 is connected by a pipe line 62 to the filter tank and by a connection 63 to the pawl. A wheel 64 keyed to the end of the ratchet wheel shaft, enables the operator to move the mechanism by hand.

Figs. 6 to 11 show a multiple filter roll arrangement in which the removal roll is centralized between two, or among more than two, filter rolls for the purpose of removing the filter fabric as contaminated from all of the filter rolls simultaneously. The construction of the filter and rolls is similar to that shown in Figs. 1 to 5, the same reference characters being used for parts that are the same. The removal roll is identical with that shown in Figs. 1 and 2 except that its shaft has a shoulder 65, which rests upon the bearing 66; and a projecting end 67, which passes through the bearing and its gland 68, and on the outer end of which is fastened a worm gear 69. The worm gear is driven by a worm 70 on the ratchet wheel shaft 71, the latter being supported by bearings 72 and 73. A feed pipe 74, and the filtrate outlet pipes 75, are welded to the bottom of the tank; and surrounding each of the outlet pipes is a housing 76 having a branch 77, whose opening is coincident with the opening 78 in the outlet pipe, the opening of the latter being slightly elongated to prevent partial closure resulting from any turning movement of the housing. This housing is supported by a flange 79, rigidly attached to the bottom of the outlet pipe, and in turn supports the filter roll filtrate pipe 80 to which it is bolted, a similar flange 81 being attached to the latter to support and allow rotative movement of the housing 82 to which it is connected by top and bottom openings 83 and 84 respectively. Gaskets 85 between the housings for both filtrate pipes, and their supporting flanges, and caps 86 for the tops of all the housings, prevent passage of unfiltered fluid into the filtrate pipes. The inlet passage of the filter roll filtrate pipe housing connects with slot 87 in the retaining wall 88 to which the housing is riveted or bolted, and the retaining wall supports the perforated cardboard tube 89 on which the filter fabric 90 is wound. Top and bottom rings 91 and 92, respectively, make the circumferential end joints, and strips 93 make the longitudinal joints, between the tube and its retaining wall; and these rings and strips may be flared or ribbed, if necessary, to make sharper contact with the cardboard winding tube. The holes 94 in the foraminous crimped plate 95 allow the filtered liquid to escape to the underside of the latter, and the crimps afford support for the cardboard tube, as well as passages for the liquid from the underside of the plate to the slot in the retaining wall opening coincident with the inlet opening in the filter roll filtrate pipe housing. To enable a winding tube to be slipped over its retaining wall and then to make close contact therewith, the latter may be retracted and expanded by means of a lever 96 on the squared end of the eccentric shaft 97, the eccentric portion 98 being used to draw the retaining wall bracket 99 closer to its cooperating bracket 100 for retraction purposes and to withdraw them from each other in order to expand the retaining wall against the winding tube. In order to increase the movement of the sides of the retaining wall, the shaft may have opposite eccentrics, one to engage each bracket. A supporting ring 101, which may be broken in several sections to allow for freer movement of the retaining wall, is attached to the lower end of the latter to support the winding tube in position until the retaining wall has been expanded against it.

The operation of the apparatus has been in part indicated in connection with the foregoing description. The filter may be opened by slackening back the locking nuts 5, dropping the eyebolts 4, and raising the cover by turning down the handwheel 11 on the threaded stud 12, after which the cover may be swung aside on its hinge bolt 9. Introduction into the filter of the large filter roll shown in Figs. 1 to 5 is accomplished by retracting the sides of the retaining wall 29 by means of the toggle lever 31, after which the filter roll may be dropped down over the wall until it rests in position on the supporting plate 36, whereupon the retaining wall may be expanded tightly against the cardboard tube, on which the fabric is wound, by a reverse movement of the toggle lever. The liquid to be filtered enters through the inlet 14 and, under a differential pressure, passes through the roll of filter fabric and perforations in the winding tube; the now filtered liquid then flowing along the grooves, and through the holes, of the crimped plate 30; through the slot 22 in the retaining wall 23 leading into the housing 19; and then through openings 16 and 17 into the outlet pipe 15 from which it leaves the filter.

The removal of the contaminated fabric from the filter roll is accomplished automatically by the rotation of the removal roll whenever a predetermined increase in the filtering pressure resulting from a decrease in the filtering rate, causes the bellows to expand and engage the constantly moving pawl 57 with the ratchet wheel 56, the turning of which results in the rotation of the removal roll shaft 41, as described above; and this rotation continues until the filtering pressure drops a predetermined amount, upon which the contraction of the bellows will cause the pawl to become disengaged from the ratchet wheel. The fabric may be attached to the removal roll by the insertion of its end between the edges of the arcuate plates 37. As the contaminated fabric builds upon the removal roll the latter will swing upon its supporting levers 43 and 44 in an arcuate path substantially tangential to a diametrical plane passing through the axis of both filter and removal rolls. These arcuate plates are spaced one from another and are supported in concentric relation about the shaft 41 by links 38, which normally extend in a radial plane but may be caused to swing upwardly until the edges of the plates touch, so as to reduce the effective diameter of the arbor and permit the contaminated fabric roll to be lifted therefrom, the link 43 being disengaged from the arbor shaft to permit removal of the fabric.

When it is desirable to keep the filter roll as small as possible, or to obtain a greater filter area in the same size filter chamber, two or more filter rolls may be used. Figs. 7 to 11 show a filter roll arrangement in which one centralized removal roll is used to remove the contaminated fabric simultaneously from all four filter rolls. In this arrangement the filter rolls are of much smaller diameter than the one roll filter described above, but the total filter area is several times greater. Introduction into the filter of one of the filter rolls is accomplished by retracting the sides of the retaining wall 88 by means of the eccentric shaft lever 96, after which the filter roll may be dropped down over the wall until it rests in position on the supporting plate 101, whereupon the retaining wall may be expanded tightly against the cardboard tube, on which the fabric is wound, by a reverse movement of the eccentric shaft lever. The liquid to be filtered enters through the inlet 74, and, under a differential pressure, passes through the roll of filter fabric and perforations in the winding tube; the now filtered liquid then flowing along the grooves, and through the holes, of the crimped plate 95; through the slot 87 in the retaining wall 88 leading into the housing 82; through openings 83 and 84 into the filter roll filtrate pipe 80, which is connected to the branch 77 of the housing 76; and from the housing through opening 78 into the outlet pipe 75 from which it leaves the filter. A shut-off cock may be provided for each outlet pipe exteriorly of the filter, and the various outlet pipes then connected into a common manifold. The long housing 76 on the outlet pipe 75 provides the necessary swinging arm support for the filter rolls, which move outwardly as the removal roll increases, and the filter rolls decrease, in diameter. In the one roll arrangement, it is generally more convenient to provide for the swinging of the removal roll. In either case, the movement of the roll should be accomplished easily so that the pull on the fabric, as it is being removed from the filter roll to the removal roll, will be sufficient to keep the rolls in frictional contact. This is necessary in order that any solids, which are supported on the thread structure of the filter fabric by the passage of a fluid through the filter roll, be immediately enclosed by the thread structure on the removal roll by the reversal of the filter fabric as the latter is removed from the filter roll and wound upon the removal roll.

It will thus be evident from the foregoing description that inexpensive winding tubes, such as cardboard, must be supported during the filtering operation, so that the retaining wall may not only provide drainage for the filter bed but may also provide support for the winding tube against collapse. The drainage and support may be provided in many ways, as by pyramidal bosses, or by longitudinal, or circumferential, grooves; and the channels thus made, may, or may not be, integral with the retaining wall.

It will furthermore be evident that filtration may be accomplished in the reverse direction by surrounding the annular filter roll with an interrupted annular drainage member and placing the removal roll on the inside of the filter roll, the sides of the retaining wall being closed by a cam or toggle or other similar movement. However, in such an arrangement a removal roll is required for each filter roll.

I claim as my invention:

1. In a filter, the combination of: a casing; a filter wall within the casing comprising an annular roll of contiguous layers of filter fabric; a removal roll attached to one end of the filter fabric; a drainage member adapted to be expanded within the filter wall, said member having passages therein to receive filtrate from the said wall; a fluid inlet communicating with the said casing and a fluid outlet communicating with the said passages; means whereby the drainage member may be expanded into engagement with the filter wall and a fluid passed through the wall and the filtrate conducted therefrom through the said passages and outlet; and means for rotating the annular roll and removal roll in frictional contact with each other whereby a portion of the filter fabric is removed from the annular roll and wound upon the removal roll.

2. In a filter, the combination of: a filter wall comprising an annular roll of contiguous layers of filter fabric; a removal roll attached to one end of the filter fabric and in frictional contact with the annular roll; a drainage member adapted to be expanded within the filter wall, said member having passages therein connected to a common outlet to receive filtrate from the said wall; means whereby the drainage member may be expanded into engagement with the filter wall, and a fluid passed through the wall under a filter differential pressure, and the filtrate conducted therefrom through the said passages and outlet; and means responsive to the filter differential pressure for rotating the removal roll when the differential pressure has varied a predetermined amount whereby the frictional contact and pull of the removal roll causes the annular roll to rotate and a portion of the filter fabric to be removed from the annular roll and wound upon the removal roll.

3. In a filter, the combination of: a casing; a plurality of filter walls within the casing, each of said walls comprising an annular roll of contiguous layers of filter fabric; an inlet communicating with the casing and an outlet communicating with each filter wall whereby a fluid may be passed through the said filter walls; a common removal roll attached to the outer end of the filter fabric of each annular roll; and means for rotating the removal roll in frictional contact with the annular rolls whereby a portion of the filter fabric is removed simultaneously from each annular roll and wound upon the removal roll.

4. In a filter, the combination of: a casing; a plurality of filter walls within the casing, each of said walls comprising an annular roll of contiguous layers of filter fabric; an inlet communicating with the casing and an outlet communicating with each filter wall whereby a fluid may be passed through the said filter walls; a common removal roll attached to the outer end of the filter fabric of each annular roll and in frictional contact with the said annular rolls; and means for rotating the removal roll whereby the frictional contact and pull of the removal roll causes the annular rolls to rotate and a portion of the filter fabric to be removed simultaneously from each annular roll and wound upon the removal roll.

5. In a filter, the combination of: a plurality of filter walls, each of said walls comprising an annular roll of contiguous layers of filter fabric; a common removal roll attached to the outer end of the filter fabric of each annular roll and in frictional contact with the said annular rolls; means for passing a fluid to be filtered through the said filter walls under a filter differential pressure; and means responsive to the filter differential pressure for rotating the removal roll when the differential pressure has varied a predetermined amount, whereby the frictional contact and pull of the removal roll causes the annular rolls to rotate and a portion of the filter fabric to be removed simultaneously from each annular roll and wound upon the removal roll.

FRED W. MANNING.